United States Patent [19]
Albert et al.

[11] Patent Number: 5,044,779
[45] Date of Patent: Sep. 3, 1991

[54] LINEAR BALL BUSH

[75] Inventors: Ernst Albert, Sand/Main; German Dütsch, Schweinfurt; Rainer Höfling, Arnstein, all of Fed. Rep. of Germany

[73] Assignee: Deutsche Star GmbH, Schweinfurt, Fed. Rep. of Germany

[21] Appl. No.: 499,898

[22] Filed: Mar. 27, 1990

[30] Foreign Application Priority Data

Mar. 31, 1989 [DE] Fed. Rep. of Germany ....... 3910457

[51] Int. Cl.$^5$ .................... F16C 29/08; F16C 29/06
[52] U.S. Cl. ........................ 384/15; 384/43; 384/45
[58] Field of Search ............. 384/15, 16, 43–45

[56] References Cited

U.S. PATENT DOCUMENTS

| | | |
|---|---|---|
| 3,400,987 | 9/1968 | Erikson . |
| 4,005,913 | 2/1977 | Thomson . |
| 4,130,286 | 12/1978 | Ernst et al. .................... 384/43 X |
| 4,273,389 | 6/1981 | Takai ............................... 384/45 |
| 4,483,985 | 3/1984 | Borel .............................. 384/45 |
| 4,723,850 | 2/1988 | Albert ............................ 384/43 |

FOREIGN PATENT DOCUMENTS

| | | |
|---|---|---|
| 050302 | 4/1982 | European Pat. Off. . |
| 211243 | 2/1987 | European Pat. Off. . |
| 1859864 | 7/1962 | Fed. Rep. of Germany . |
| 2135344 | 1/1973 | Fed. Rep. of Germany . |
| 3512858 | 10/1986 | Fed. Rep. of Germany . |
| 3644743 | 7/1987 | Fed. Rep. of Germany . |
| 3826944 | 2/1990 | Fed. Rep. of Germany . |
| 2248439 | 5/1975 | France . |
| 2388159 | 11/1978 | France . |
| 1262276 | 2/1972 | United Kingdom . |
| 2066378 | 7/1981 | United Kingdom . |

Primary Examiner—Thomas R. Hannon
Attorney, Agent, or Firm—Brumbaugh, Graves, Donohue & Raymond

[57] ABSTRACT

In a linear ball bush of part-annular form it is proposed that part-annular seals are secured against rotation about the cage axis by shape-locking engagement with a cage and are movable radially in relation to the cage axis over their substantially entire circumferential extent. Further it is proposed that longitudinal seal strips each comprise a root part received by a longitudinal groove of the cage and a tongue part resting on the shaft, these longitudinal sealing strips being provided with projections at their ends which rest under a longitudinal tension against an axially directed support shoulder of the cage.

22 Claims, 12 Drawing Sheets

LINEAR BALL BUSH

BACKGROUND OF THE INVENTION

The invention relates to a linear ball bush of part-annular form comprising a cage with a cage axis, with a plurality of ball circuits, and with a gap defined by longitudinal faces, where each ball circuit comprises two straight ball rows substantially parallel to the cage axis, namely a carrier ball row and a return ball row, and two curved ball rows connecting the two straight ball rows, where further the carrier ball row in each case is radially outwardly supported by a carrying straight track section and radially inwardly partially penetrates a slot of the cage, in order to be able to abut on a shaft partially enclosed by the cage, where furthermore, if desired, longitudinal sealing strips are provided for abutment on the shaft possibly on the cage close to its longitudinal faces which limit the longitudinal gap, and where part-annular seals are provided for abutment on the shaft, close to the axially directed ends of the cage.

STATEMENT OF THE PRIOR ART

A linear ball bush of part-annular form of this style of construction is known from DE-OS 3,512,858. In this case the part-annular seals are rigidly secured on the axial end faces of the cage, for example by adhesion, by ultrasonic welding or by reception in corresponding grooves. The rigid securing of the part-annular seals in fact secures these part-annular seals against unintended twisting about the cage axis, but if deviations of alignment of the shaft axis occur in relation to the axis of the reception bore, uniform abutment of the part-annular seals on the shaft is no longer guaranteed, and larger gaps can even occur between the part-annular seals and the shaft.

OBJECT OF THE INVENTION

The invention is based upon the problem of indicating a linear ball bush of the kind as initially stated in which the part-annular seals for the one part are secured against twisting about the cage axis in relation to the longitudinal gap, but on the other hand tight abutment of the part-annular seals on the shaft on the major part of the circumferential length of the part-annular seals is guaranteed even if deviations of alignment occur between the shaft axis and the bearing bore receiving the linear ball bush.

SUMMARY OF THE INVENTION

To solve this problem it is proposed in accordance with the invention that the part-annular seals are secured, by shape-locking engagement means placed close to the longitudinal faces against twisting about the cage axis.

It is here possible that the part-annular seals are radially movable in relation to the cage axis over their entire circumferential extent. This can be achieved especially in that the shape-locking engagement means permit a certain radial play of the part-annular seals. This radial play can however move towards zero, without loss of the essential effect of the invention, if only the shape-locking engagement means are limited to the gap region.

A mounting of the part-annular seals on the cage which is reliable despite the required radial mobility can be brought about in that the part-annular seals are radially movably accommodated by means of a radially outer basic body each in a part-annular groove on the cage, and rest on the shaft by means of a radially inner sealing lip.

As regards manufacturing and assembly techniques it is especially advantageous if the part-annular grooves are limited by mutually opposite, axially directed, part-annular groove limiting faces of the cage and of an end ring secured to the cage. Especially the installation of the part-annular seal in each cased is then facilitated, in that this seal is applied axially against the respective part-annular groove limiting face of the cage, and the end ring is fitted thereon.

One simple possibility of peripheral positional securing of the part-annular seal consists in that at least one axially directed dog, which extends with radial play through a piercing of the sealing ring, is fitted on the axially directed part-annular groove limiting face of the cage.

In order to ensure that the part-annular seal cannot be clamped between the part-annular groove defining faces of the cage and of the end ring, and thus lose its radial mobility, it is proposed that the axial height of the dog is greater than the corresponding axial thickness of the part-annular seal, and that the end ring rests with its part-annular groove defining face on the dog.

Due to the fact that the end ring is screwed with the cage in the region of the dog, the object is achieved that the end ring is not subjected to any deformation, and no additional apertures are necessary for the securing screws.

An advantageous manner of securing for the longitudinal seal strips is obtained if the longitudinal seal strips each comprise a root part accommodated by a longitudinal groove of the cage, and a tongue part resting on the shaft. For the adaptation of the longitudinal seal strips to deviations of alignment it is advisable that the root part is movable in the longitudinal groove in each case radially in relation to the cage axis.

The longitudinal sealing strips have a very small cross-section and are manufactured from rubber-elastic material. In order nonetheless to guarantee a secure mounting of the longitudinal sealing strips, even if the longitudinal sealing strips are no longer stuck in position as in the prior art, and especially to prevent the longitudinal sealing strips from being deformed with fold formation in the case of longitudinal movements of the shaft in relation to the cage, it is proposed that the longitudinal sealing strips have projections at their ends which rest in each case against an axially directed support shoulder of the cage, under a longitudinal stress of the longitudinal sealing strip in each case. It is here to be noted that this measure is usable independently of the manner as proposed in claim 1 for fitting the part-annular seals.

In order to be able to bring the longitudinal seal strips and the part-annular seals as close as possible to one another, and thus to ensure an especially reliable sealing of the whole ball region, it is proposed that the support shoulder is formed by an aperture in each case in the cage, adjoining the axially directed annular groove limiting face of the cage.

An optimum seal is also achieved in the region of approximation of the longitudinal seal strips and the part-annular seals due to the fact that the longitudinal seal strips possess extensions protruding beyond the projection in each case into the annular groove, and that the part-annular seals each rest with their ends on an extension.

The invention further relates to a longitudinal seal strip for a linear ball bush. Here it is proposed that the longitudinal seal strip comprises at its ends in each case axially outside the projections, grip elements which can if desired be cut away, leaving the extensions, after the respective longitudinal seal strip has been installed in the respective longitudinal groove. Due to this formation of the longitudinal seal strip especially simple fitting is achieved.

The various features of the invention are discussed especially in the accompanying claims which form a part of the disclosure. For the better understanding of the invention, its working advantages and specific effects reference is now made to the accompanying drawings and the description, in which preferred forms of embodiment of the invention are discussed.

BRIEF DESCRIPTION OF THE FIGURES

The accompanying FIGS. explain the invention by reference to an example of embodiment. For the illustration of the overall technical context.

DETAILED DESCRIPTION OF THE PREFERRED EMBODIMENTS

Figure 1:
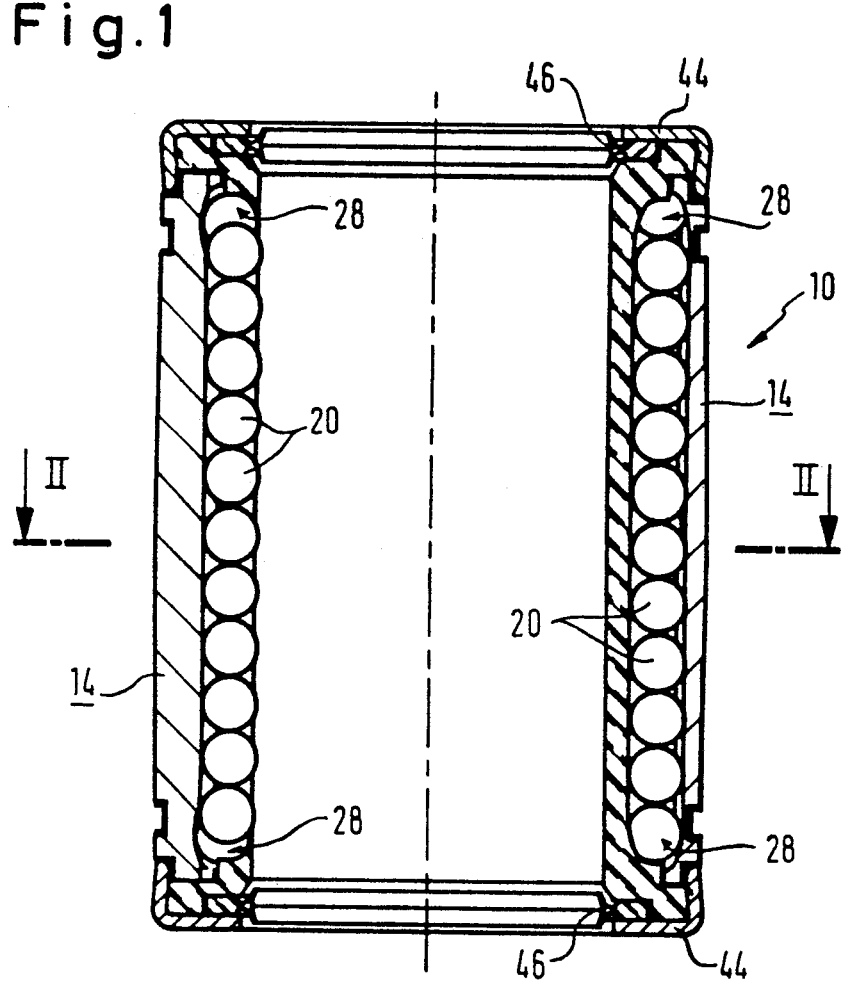
FIG. 1 represents a longitudinal section through a linear ball bush according to the invention.
Figure 2:
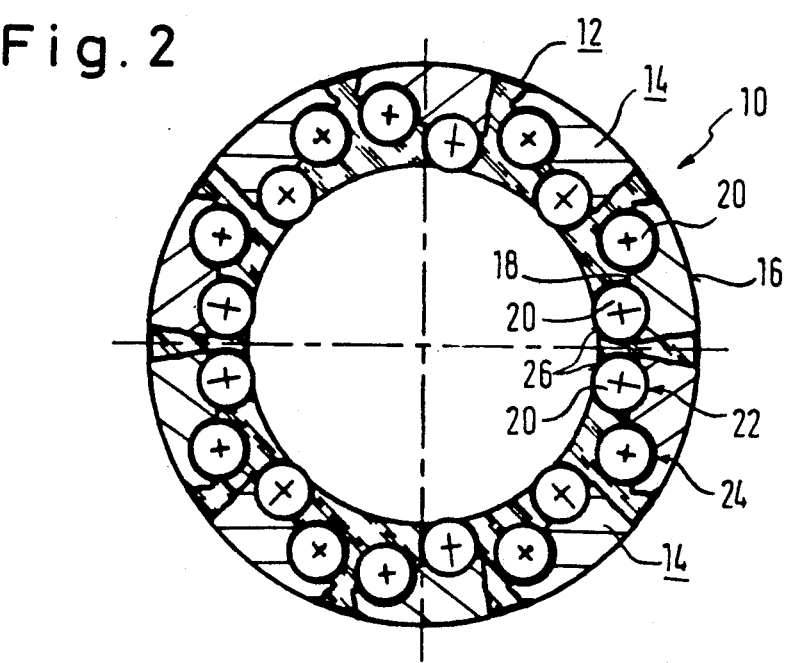
FIG. 2 represents a cross-section along the line II—II in FIG. 1.

In FIGS. 1 and 2 a linear ball bush is designated quite generally by 10. It includes a cage 12 of hard-elastic synthetic plastics material Into this cage 12 there are inserted runner plates 14 each possessing an external circumferential face 16 for abutment on a bearing housing bore receiving the linear ball bush 10, and an internal circumferential surface 18. The runner plates 14 consist of a hard material, especially hardened steel. By the cage 12 and the runner plates 14 in each case a guide is formed for a ball circuit. The balls are designated by 20. Each ball circuit forms a carrier ball row 22 and a return ball row 24 The carrier ball rows 22 extend through slots 26 of the cage 12 radially inwards to abut on a shaft (not shown). The return ball rows 24 are radially inwardly supported by the cage 12. Both straight ball rows 22 and 24 lie against the inner circumferential surface 18 of the respective runner plate 14. The carrier ball row 22 and the return ball row 24 are in each case connected by curved ball rows 28. The runner plates 14 are held in. shape-engaging manner in the cage 12, but with a certain movement play.

Figure 4:
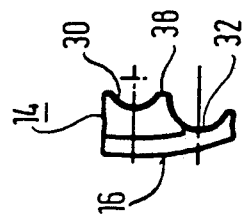
FIG. 4 represents an end view of a runner plate according to FIG. 3.
Figure 6:
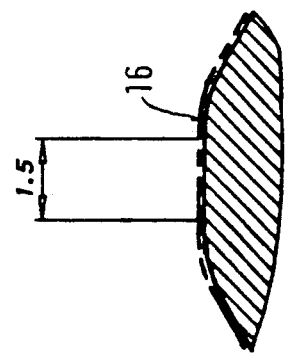
FIG. 6 represents an enlargement of the zone VI in FIG. 5, in a section corresponding to that in FIG. 5.
Figure 3:
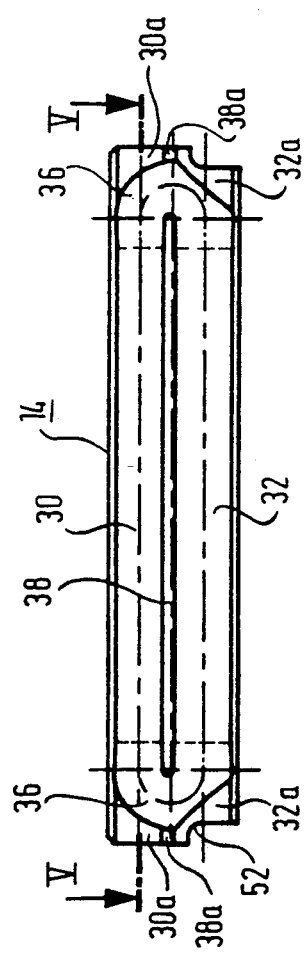
FIG. 3 represents a view of the inner side of a runner plate.
Figure 5:
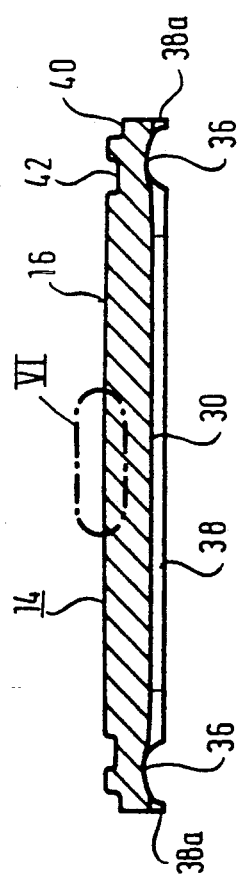
FIG. 5 represents a section along the line V—V in FIG. 3.

In FIGS. 3, 4 and 5 a runner plate 14 is illustrated individually. This runner plate 14 is produced on the basis of a profiled bar the profile of which can be seen from FIG. 4. The runner plate 14 comprises a carrier straight track section 30 which possesses a first higher level in relation to the external circumferential surface 16, and a returning straight track section 32, which possesses a lower level in relation to the external circumferential surface 16. The carrier track section 30 serves to receive the carrier ball row 22 and the straight track section 32 serves to receive the return ball row 24. The two straight track sections 30 and 32 are connected with one another by curved track sections 36. However the straight track sections 30 and 32 extend with the end sections 30a and 32a with substantially constant profile as far as the ends of the runner plate 14. Between the straight track sections 30 and 32 there lies a middle rib 38. The middle rib 38 continues with end sections 38a as far as the ends of the runner plate 14 with constant profile, and is merely interrupted by the curved track sections 36 At its external circumferential surface 16 the track plate is curved, as shown in FIG. 6, so that it comes to abut in swinging manner on the internal circumferential surface of a bearing housing bore. As may be seen from FIG. 4, the straight track sections 30 and 32 are rounded with a radius of curvature which is equal to or a little greater than the radius of the balls 20.

In FIG. 5 turned apertures 40 and 42 are seen at the ends of the runner plate. The turned apertures 40 are intended to receive pot-shaped end rings 44 (FIG. 1) which secure the runner plate 14 and closure washers 46 on the cage 12. The turned apertures 42 are intended to receive securing rings for the axial securing of the ball bush in a receiving bore.

Further details on the formation of the tracks appear from FIGS. 7 to 11. The curved track sections 36 extend over approximately 180° and are of nearly circular curvature. The drop in level from the straight track sections 30 to the straight track section 32 begins as early as an end section a of the straight track section 30. Thus the floor of the curved track section 36 in the region of intersection with the straight track section 30 lies lower than an imaginary continuation of the floor of the straight track section 30, and a lateral guidance of the balls is guaranteed in this intersection zone too. The level gradient in the end section a is represented by the angle indication 2° in FIG. 8. The level gradient in the directly adjoining region of the curved track section 36 amounts to about 5°, as likewise illustrated in FIG. 8. No jumps in level occur. The gradient transitions are rounded. The longitudinal extent of the end section a is so large, even after grinding, that the loaded balls can be continuously relieved of load before entry into the curved track section 36. This is analogously also valid for the balls entering the load zone. By this measure a uniform and jerk-free course is guaranteed At the point 6 in FIG. 7 the curved track 36 possesses a level minimum which lies below the level of the returning straight track 32. In the end section b of the returning straight track section 32 a slow rise of level takes place. No jumps in level occur. The gradient transitions are rounded. The level minimum ⑥ is still present even after the grinding of the returning s track section 32. The gradient distances a and b of the straight track sections 30, 32 are swaged together with the curved track sections 36. The tapering of the rib width of the middle rib 38 in the region of the end sections a and b results in a funnel-shaped transition of the curved track section 36 into the straight track sections 30 and 32.

Figure 7:
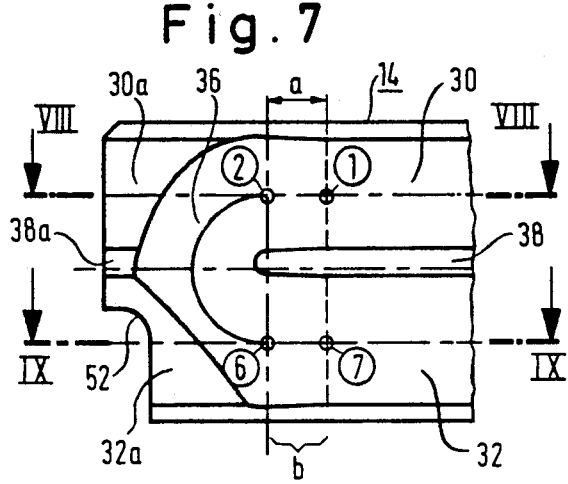
FIG. 7 represents an enlargement of an end section of the runner plate according to FIG. 3.
Figure 8:
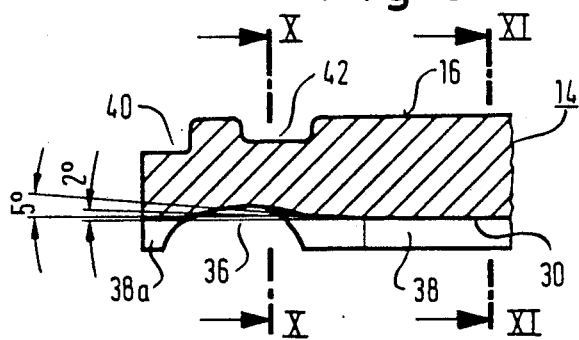
FIG. 8 represents a section along the line VIII—VIII in FIG. 7.
Figure 9:
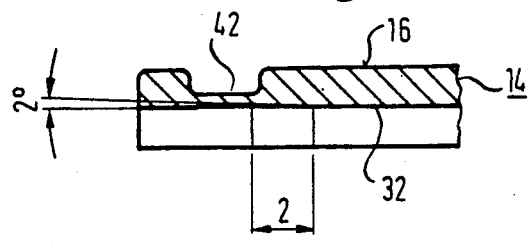
FIG. 9 represents a section along the line IX—IX in FIG. 7.
Figure 10:
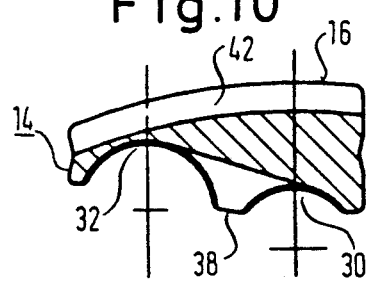
FIG. 10 represents a section along the line X—X in FIG. 8.
Figure 11:
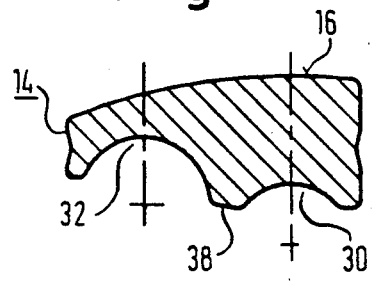
FIG. 11 represents a section, along the line XI—XI in FIG. 8.
Figure 12:
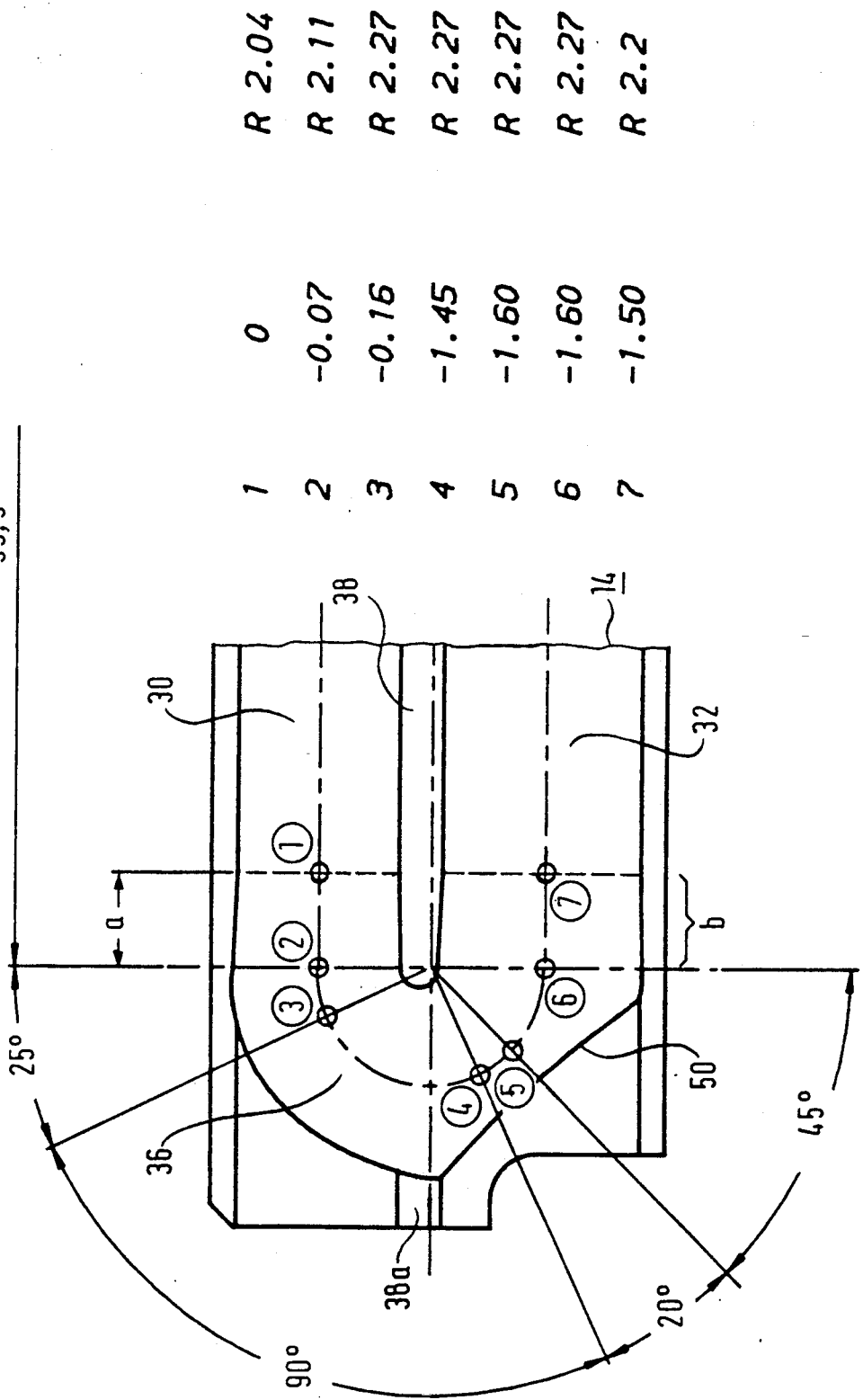
FIG. 12 represents a plan of levels with tabular listing of the floor levels of the track in an end section of the runner plate according to FIG. 7.

In FIG. 12 different measurement points, some of which were also entered in FIGS. 7 in order to clarify the relationships between FIG. 7 and FIG. 12, are designated by ① to ⑦. Different level values are allocated to these measurement points, by way of example, according to the table in FIG. 12. The level values designate the relative level height in millimeters in each case on the floor of the track in relation to the floor level of the carrier track section 30, to which the value zero is allocated.

From the second column of the table it is readily seen that in the region ⑤ to ⑥ a minimum level is present and that starting from this minimum level a rise of level takes place to the height level of the floor of the returning straight track section 32. The reascent ⑥ to ⑦ lies substantially in the straight return line of the returning straight track section 32. Locus co-ordinates allocated to the individual points ① to ⑦ are designated by the angle values in FIG. 12. FIG. 12 communicates, by the length statement 39.5 mm., an idea of order of magnitude too of the length of the ball bush. As supplement thereto let it be remarked that the external diameter of the cage 12 amounts in the case of the example to 40 mm., that in all 10 runner plates are provided, as represented in FIG. 2, that the peripheral extent of a runner plate amounts to 9.7 mm. and that the ball diameter amounts to 3.969 mm. Finally the radius of curvature of the track, measured at the floor (dot-and-dash line in FIG. 12) amounts to 2.04 mm. Finally in the table in the fourth column there are entered the radii in each case of the track sections in millimeters. It is seen that these radii are little larger than the ball radius, so that the balls are laterally guided. It is seen from FIG. 12 and the table that in the region ① to ④ a lateral guidance is guaranteed; this lateral guidance is supplemented in the apex region ④ by the continuation 38a of the rib 38. Even in the relatively uncritical region ④ to ⑦ a certain lateral guidance of the balls by the runner plate is still guaranteed, as indicated by the intersection line 50. It should be mentioned once more that the individual gradient distances from ① to ⑦ merge into one another substantially steadily.

The guidance of the balls is supplemented by the cage 12. The guide faces in the cage 12 are manufactured with high precision so that they adjoin the guide faces of the runner plates without stagger.

The apertures 52 which can be seen in FIGS. 3 and 7 serve in part to receive material in the swaging of the curved track sections 36; in other words: In swaging the runner plates 14 are laid with previously formed apertures into swaging moulds which rest on the external circumferential surface 16 and the end faces, but in the region of the apertures 52 leave so much clearance that the material displaced in swaging can flow in and then the geometry of the apertures according to FIG. 7 is produced.

Figure 13:
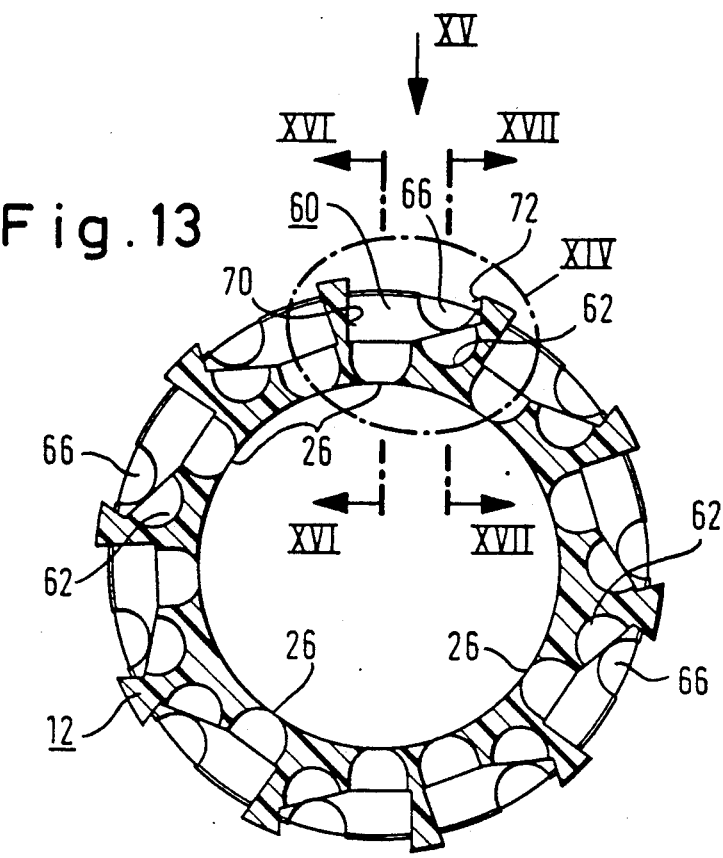
FIG. 13 represents a cross-section through a cage along the line II—II in FIG. 1, but after removal of the runner plates and balls.
Figure 14:
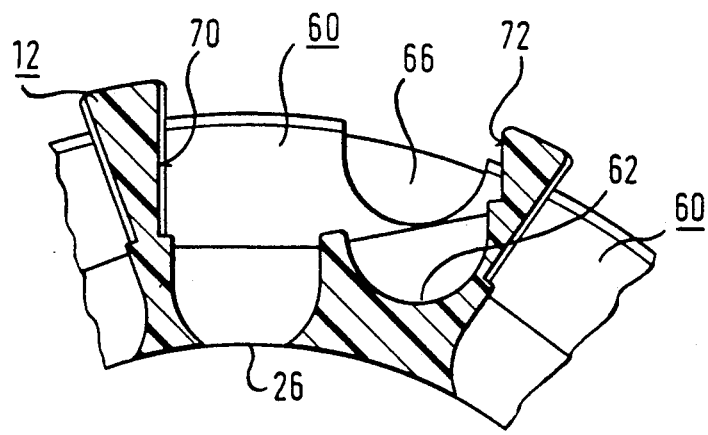
FIG. 14 represents a detail of FIG. 13 in enlarged form.
Figure 15:
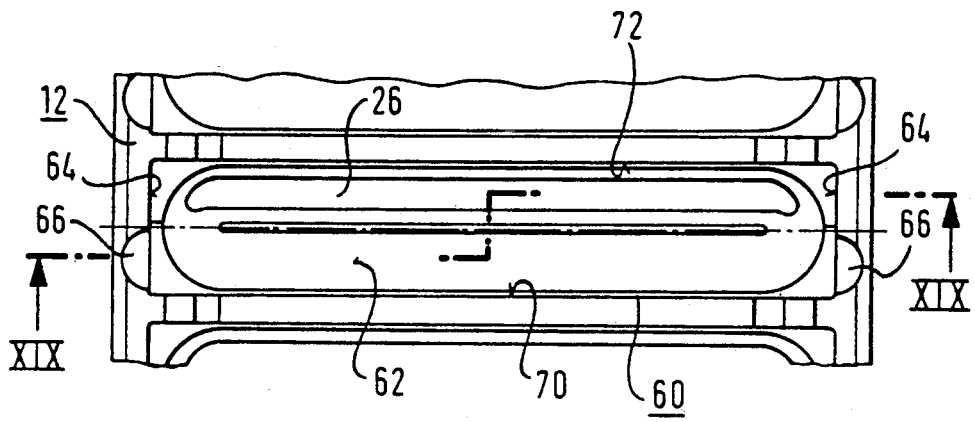
FIG. 15 represents a partial view of the cage in the direction of the arrow XV in FIG. 13.
Figure 16:
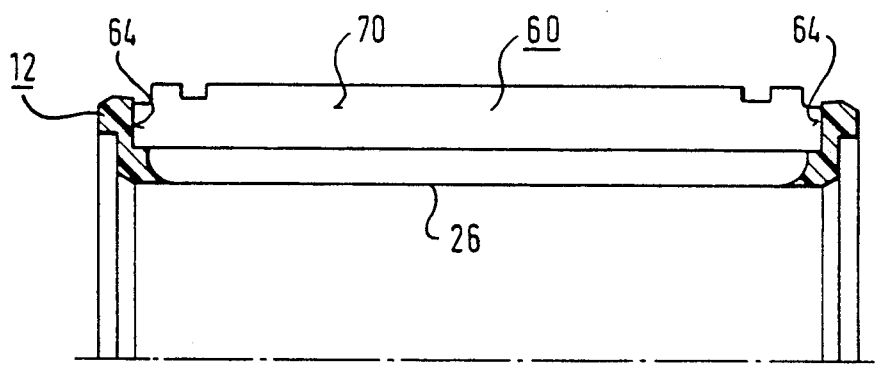
FIG. 16 represents a longitudinal section through the cage along the line XVI—XVI in FIG. 13.
Figure 17:
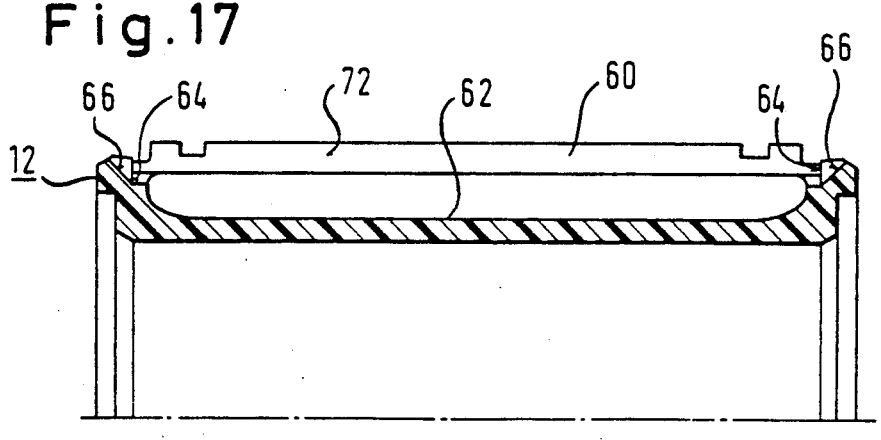
FIG. 17 represents a longitudinal section along the line XVII—XVII in FIG. 13.

In FIG. 13 the cage according to FIG. 2 is represented after removal of the runner plates 14 and the balls 20. The apertures 60 for the accommodation of the runner plates 14 from FIG. 2 are seen there. One further sees the slots 26 which in part permit passage of the balls of the carrier ball row 22 and one sees the track 62 for the return ball row 24 in FIG. 2 All this is represented in enlargement in FIG. 14 too. It is further seen from FIGS. 14 and 15 that at the ends of the apertures 60, namely adjoining the end faces 64 of the apertures 60, filling slopes 66 of channel form are arranged in alignment with the tracks 62, the significance of which slopes may be seen especially from FIG. 19. There a filler pipe 68 is fitted for the charging of the balls 20 of a ball circuit, so that the pipe is approximately in continuation of the filling slope 66 in each case. In this case the upper pot-shaped end ring 44 is removed, while the lower pot-shaped end ring 44 assumes its securing position in relation to the runner plates 14. Since the upper end ring 44 is absent, the runner plate 14 can be set obliquely, as may be seen from FIG. 19, so that in the region of the entry slope 66 it permits admission of the balls 20. The oblique placing of the runner plates 14 is possible since the longitudinal defining faces 70, 72 of the aperture 60 are approximately parallel to one another, or the synthetic plastics material of the cage 12 is elastic in such a way that a setting out of the runner plate 14 under constraint is possible.

Figure 18:
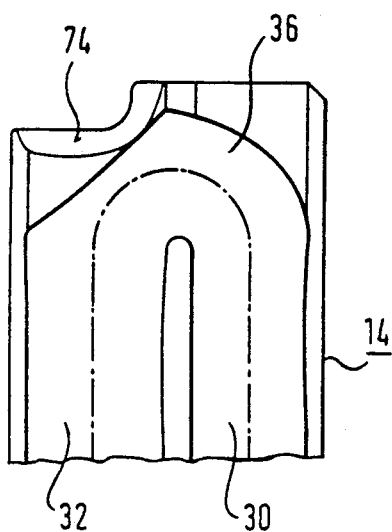
FIG. 18 represents a partial view of a runner plate according to FIG. 7, but with an end bevel.
Figure 19:
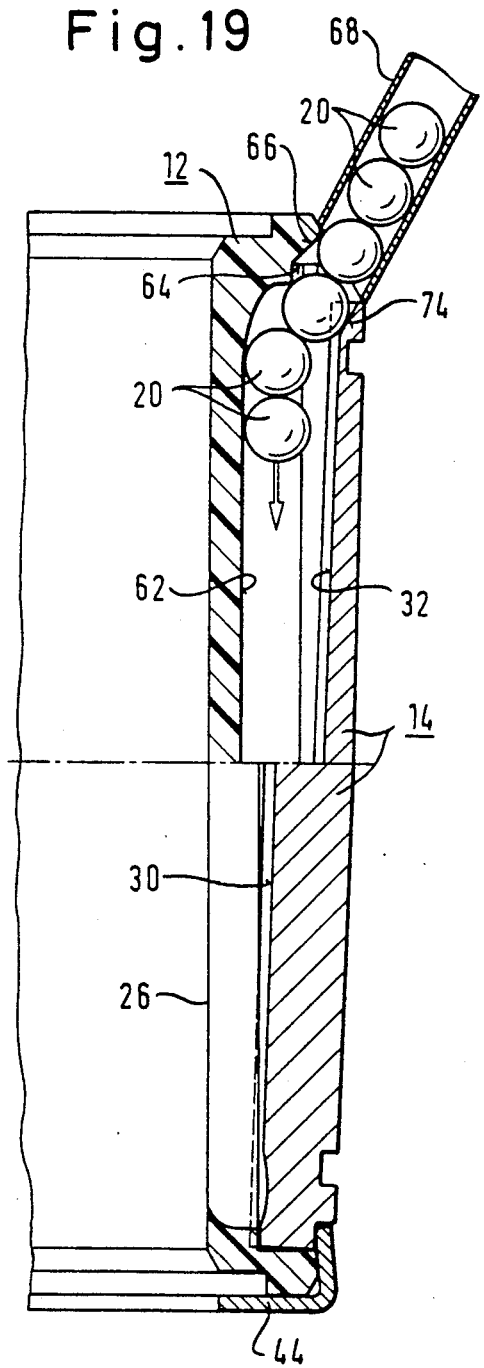
FIG. 19 represents a section along the line XIX-—XIX in FIG. 15 in the charging of balls; De For the illustration of the actual invention.

The charging of the balls 20 into the track 62 of the return ball row is also facilitated by the fact that a bevel 74 is provided on the inner side of the runner plate 14, as may be seen from FIGS. 18 and 19.

It should be remarked that the nature of the charging, using the filling slope 66 and the bevel 74, is not bound to the fact that the two straight track sections 30, 32 and the curved track sections 36 are provided on the runner plate 14. The manner of filling would rather be conceivable even if the runner plates 14 were limited to the width of the straight track sections 30 of the carrier ball rows. In this case only the filling slopes 66 and the bevels 74 would have to be provided in alignment with the respective straight track section 30 of a carrier ball row.

Figure 20:
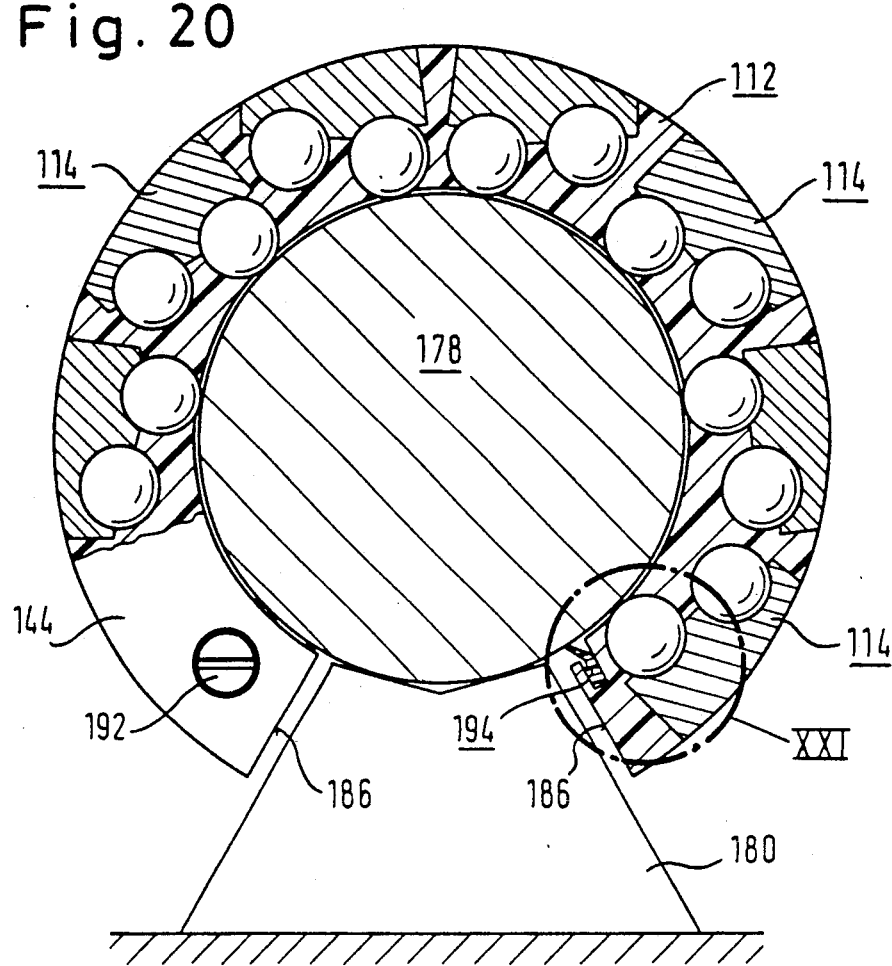
FIG. 20 represents a section through a linear ball bearing according to FIG. 1, but modified in so far as the cage is made in part ring form for the reception of a support for the shaft.
Figure 21:
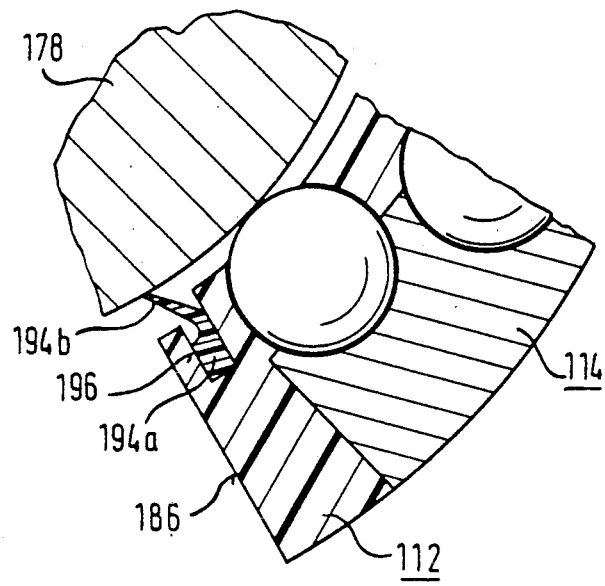
FIG. 21 represents a detail corresponding to the point XXI in FIG. 20, in enlargement.
Figure 22:
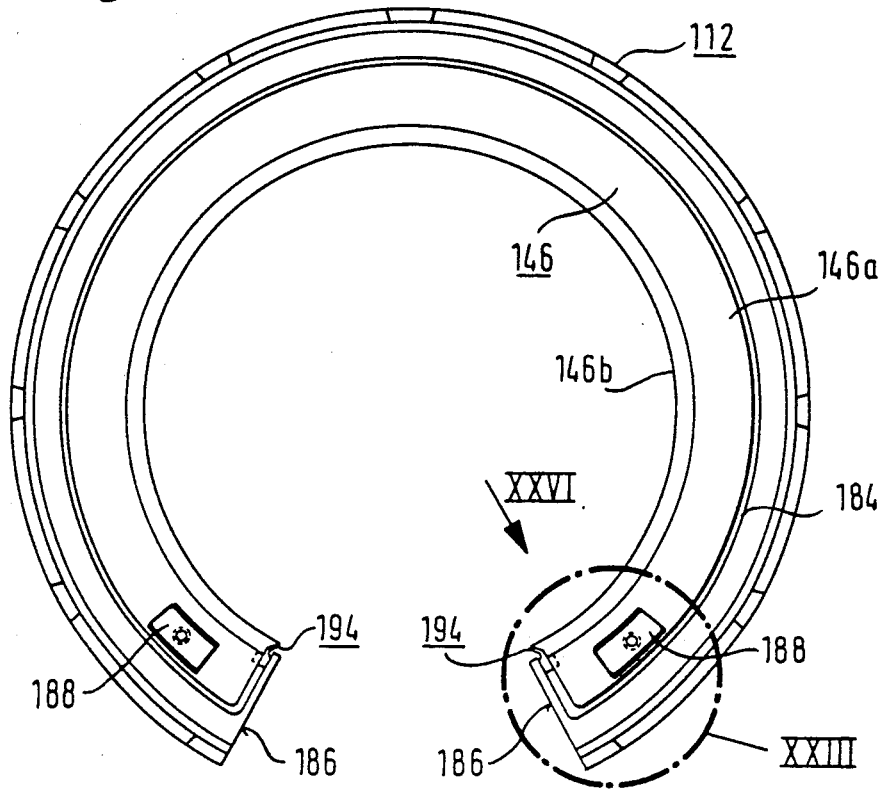
FIG. 22 represents an end view of a linear ball bearing according to FIG. 20, where a likewise part-annular, pot-ring-shaped end ring is removed.

In FIG. 20 there is seen a linear ball bearing in which the shaft 178 is supported by pedestals 180 and the cage 112 is made in part-annular form. The cage is again provided at its ends with end rings 144 which are made in part-annular form in accordance with the circumferential extent of the cage 112. Seals are provided to prevent the penetration of dirt into the region of the balls.

In FIG. 1 the closure washers 46 were indicated. There are the necessary sealing rings which are held on the cage by end rings 44 and come to abut with a sealing lip on the shaft (not shown there). These sealing rings are also needed in the form of embodiment according to FIG. 20, which is now under discussion, and these sealing rings are seen in FIGS. 22 to 25, where they are designated by 146 and are composed in each case of a basic body 146a and a sealing lip 146b. The sealing lip 146b is here again intended to abut on the shaft 178 according to FIG. 20. The basic body 146a of the sealing ring 146 is here accommodated, as may be seen especially from FIGS. 23, 24 and 25, in an annular recess 184 of an end face 185 of the cage 112, which is defined by an axially directed face 184a and a radially inwardly directed face 184b and is limited at its ends by end strips 184c. The basic body 146a lies with axial play between the axially directed face 184a of the cage 112 and an axially directed face 144a of the end ring 144 resting on the end face 185. The oversize of the aperture 184 compared with the diameter of the basic body 146a (FIG. 25) permits the basic body 146a radial play within the aperture 184. This radial play also exists in the form of embodiment according to FIG. 1, and there too is of essential importance, but has not there been mentioned hitherto. The radial play is necessary in order in a displacement in angle of the shaft 178 in relation to the cage 112 to render possible ar adaptation of the sealing ring 146 to the altered geometry. While now in the form of embodiment according to FIGS. 1 to 13 the sealing ring 46 (there called closure washer) is closed in circular form and therefore can be movable in the peripheral direction without this interfering with the bearing operation, in accordance with the invention the sealing rings 146 are of part-annular form, that is open. As before the necessity still exists of permitting radial play to the sealing rings 146, in order to render possible their adaptation to modified bearing geometry in the case of loss of alignment between shaft 178 and cage 112. However the necessity exists at the same time of avoiding a twisting of the sealing rings 146, since these sealing rings 146, in the case of a twistability, could protrude beyond the one or other end face 186 of the cage (see FIG. 22) or recede behind it.

Figure 23:
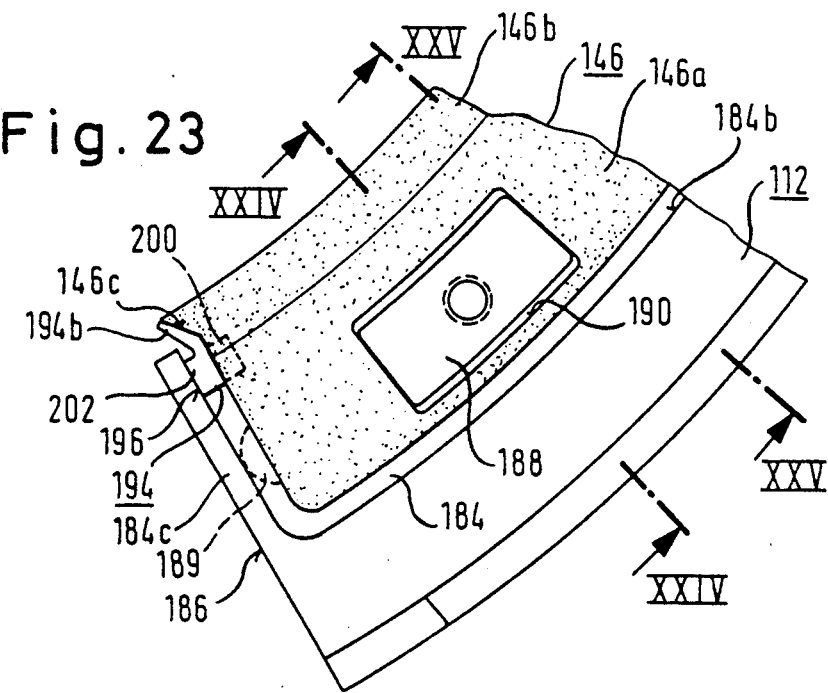
FIG. 23 represents an enlargement of the detail XXIII in FIG. 22.
Figure 24:
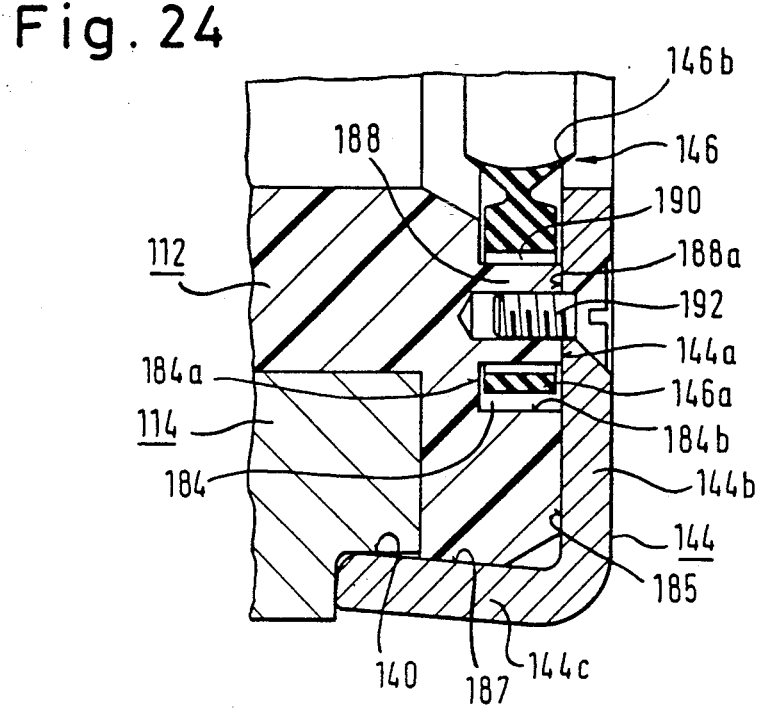
FIG. 24 represents a section along the line XXIV—XXIV in FIG. 23.
Figure 25:
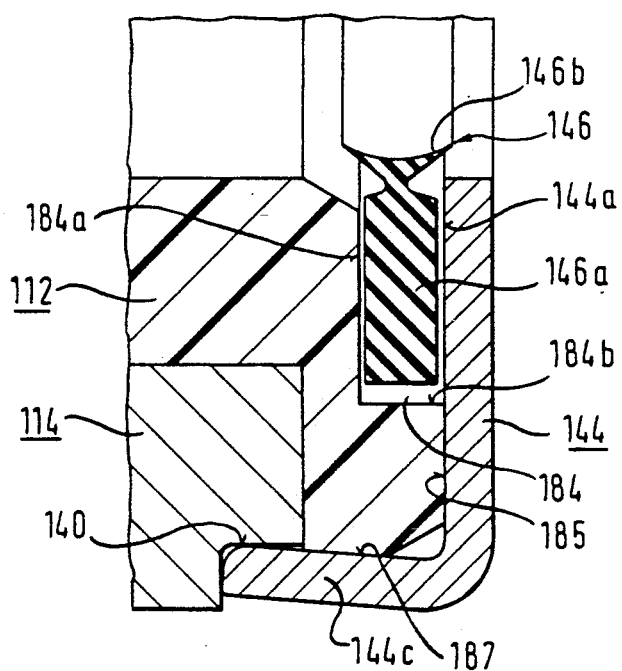
FIG. 25 represents a section along the line XXV—XXV, in FIG. 23.

In order to leave the sealing ring 146 movable in the radial direction, but to make it fast in the peripheral direction, an embodiment is foreseen as represented in detail in FIGS. 23 and 24. Above the axially directed surface 184a there rise dogs 188 which can also be seen in FIGS. 22 and 23. These dogs 188 pass through piercings 190, as may be seen from FIGS. 23 and 24. Here the piercings 190 have a radial dimensional excess over the radial width of the dogs 188, so that the sealing rings 146 again have a radial play, as before. It is here to be noted that according to FIG. 22 the dogs 188 are fitted only in the end zones of the sealing ring 146, that is close to the support bearings 180 in FIG. 20. It is further to be noted that the height of the dogs 188 opposite to the axially directed face 184a of the cage 112 is greater than the axial thickness of the basic body 146a in each case. The face 144a, that is the inner side of the pot bottom 144b of the pot-shaped end ring 144 lies against the end face 188a of the dog 188 in each case and is there screwed to the cage. The screw connection takes place by means of a countersunk screw 192 which is screwed into the dog 188. On account of the oversize of the axial height of the dog 188 compared with the axial thickness of the basic body 146, even when the countersunk screw 192 is fully tightened the basic body 144a is not clamped in between the faces 184a and 144a. Thus even to this extent the radial play of the sealing ring 146 is maintained. According to FIG. 24 it can also well be seen that the annular wall 14c engages in the turned recesses 140 of the runner plates 114 and rests on the bevelled outer circumferential surface 187 of the cage 112, so that the runner plates 114 are axially and radially held in the cage. It is to be remarked that the peripheral securing of the annular seals can also be effected by projections 189 of the annular seals 146 against the end strips 184c (FIG. 23). Then the dogs 188 would be needed nevertheless for the securing the end rings 144. The dogs 188 could then however possess peripheral play in relation to the piercings 190, beside the still necessary radial play.

The sealing problem is not yet solved with the annular seals a 146 alone. As may be seen from FIGS. 20 to 23 and 26 and 27, in the region of the gap limitation faces 186 in the cage 112 there are also provided longitudinal sealing strips 194 with a root part 194a and a tongue part 194b resting on the shaft 178.

Figure 26:
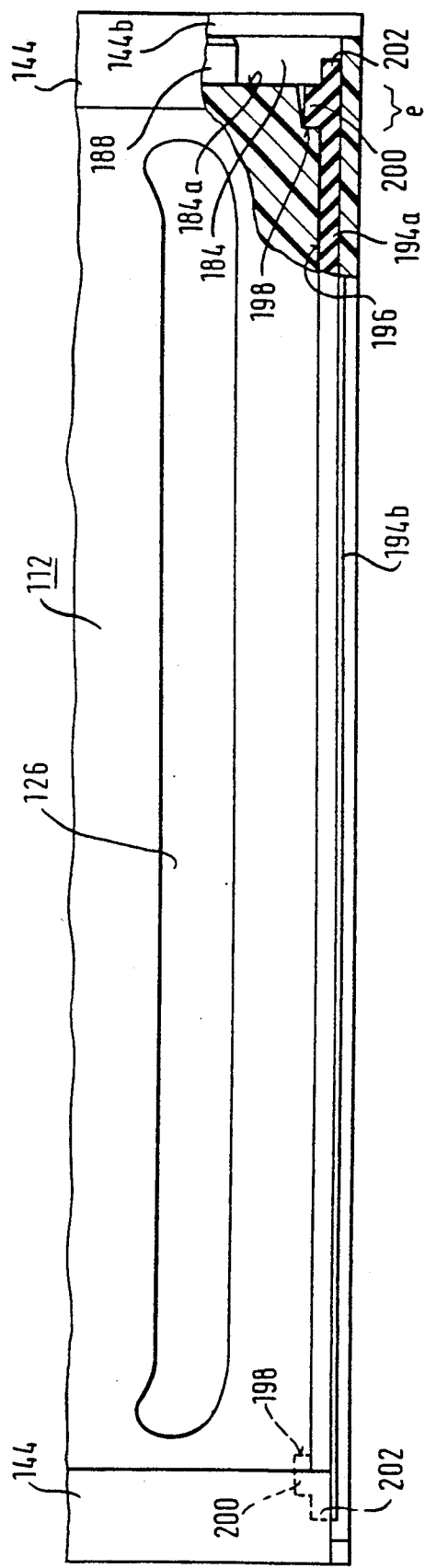
FIG. 26 represents a partial view in the direction of the arrow XXVI in FIG. 22, partially in section.

The root part 194a is inserted in an axially extending and radially inwardly open groove 196 of the cage 112 close to its gap defining face 186 in each case. The grooves 196 extend in each case as far as the axially directed faces 184a and are peripherally widened in their end sections e, so that support shoulders 198 are formed (FIG. 26). The root parts 194a of the longitudinal sealing strips 194 comprise peripherally protruding projections 200 in the axial end zone, which rest against the support shoulders 198. The longitudinal seal strips 194 possess continuations 202 of constant section with root part 194a and tongue part 194b, which project to beyond the projections 200 in the direction towards the bottom wall 144b of the end ring 144 into the annular recess 144 so that, as represented in FIG. 23, the sealing ring 146 comes to abut on the continuation 202. The end faces 146c facing in the peripheral direction are adapted to the profile of the sealing strips 194. Due to the mutual abutment of the continuations 202 and the sealing rings 146 in the region of the recess 184, the interspace between the shaft 178 and the cage 112 is sealed off completely.

Figure 27:
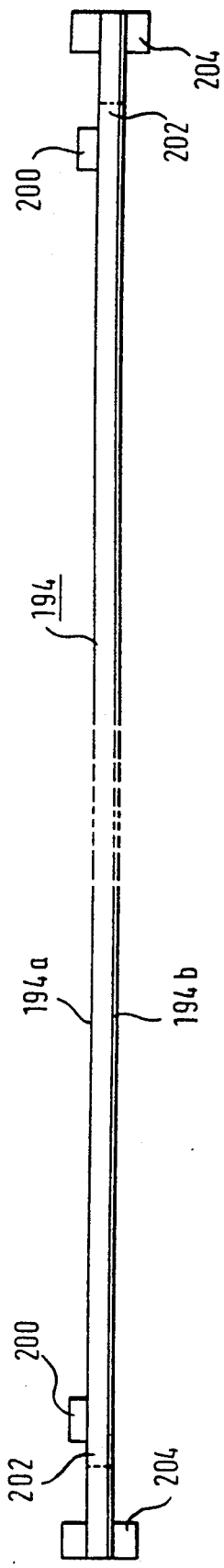
FIG. 27 represents a longitudinal sealing strip as detail of FIG. 26.

FIG. 27 shows the longitudinal sealing strip 194 before assembly. Axially outside the projections 200 grip elements 204 are fitted on the two ends of a longitudinal sealing strip 194, which grip elements render it possible, in the fitting of the longitudinal sealing strips 194, to stretch their sections placed between the projections 200 so that the projections 200 can be pushed forward over the shoulder faces 198 and supported on these. After assembly has taken place the grip elements 204 are cut away outside the continuations 202, the continuations 202 being left.

In FIG. 28 there is again seen a runner plate 14 the outer face 16 of which has already been indicated diagrammatically in FIG. 6. The outer face 16 comprises a middle rectilinearly extending longitudinal section f, which is adjoined, by way of transitional curvatures g with a radius gl of curvature in each case, by an axial longitudinal section h, which is likewise rectilinear The longitudinal section h includes with the longitudinal section f an angle of 35 minutes. The total length of the carrying ball row is designated by i. Regarding the size ratios the following is valid:

The length i of the carrier ball row amounts to about 100% to 200%, preferably about 130% to about 180% of the diameter of the shaft 178; the length of the middle longitudinal section f amounts to about 2% to about 15%, preferably about 5% to about 10% of the diameter of the shaft 178; the radius gl of curvature of the transitional rounding g amounts to more than about 100%, preferably more than about 150% and for example 167% to 300% of the diameter of the shaft 178. The angle inclination α amounts to about 25 to 45 minutes of angle, in the case of the example about 35 minutes of angle.

Figure 28:
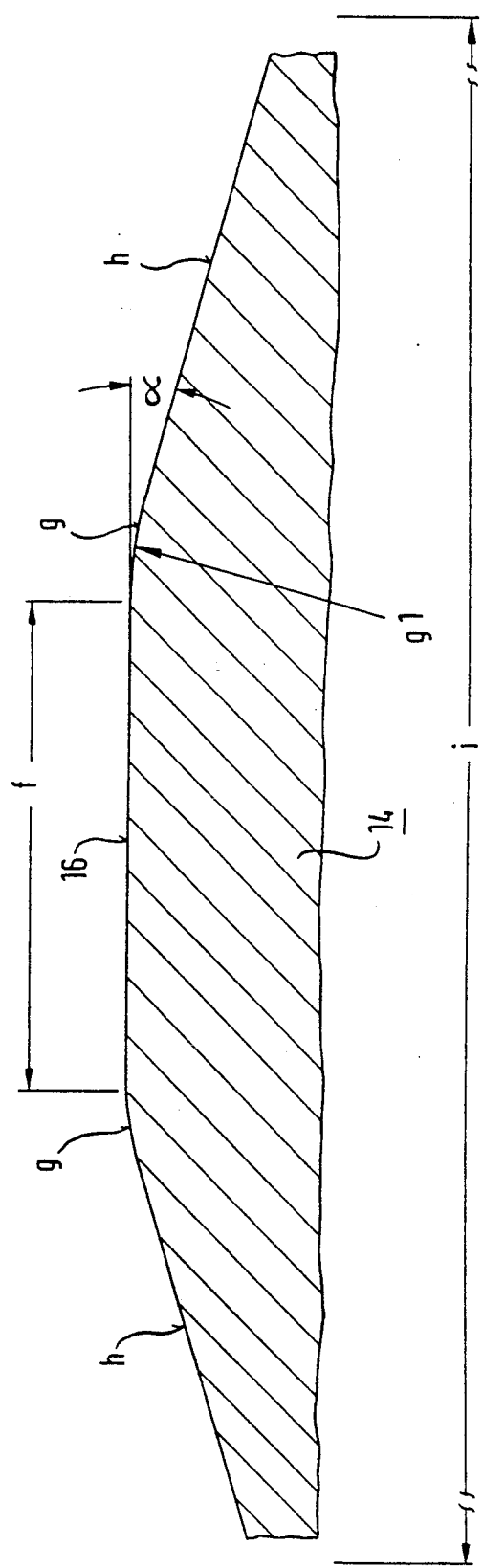
FIG. 28 represents an illustration of the runner plate according to FIG. 6.

It has appeared that if the stated dimensions are maintained a certain capacity for tilt or swing of the runner plates 14 is guaranteed, but on the other hand in normal operation due to the rectilinearity in the middle length region f the pressure per unit area compared with a surrounding bearing bore is reduced to such extent that the wear remains low. It has further appeared that if the stated dimensions are maintained, in the range of the tilting movements to be expected in the case of loss of alignment between shaft axis and cage axis, the approach of diametrically mutually opposite runner plates 14 remains within acceptable limits and thus so does the pressure which the balls exert against the shaft 178 for one part and against the runner plates 14 for the other part. The form of embodiment of the runner plates according to FIG. 28 is as described above and also usable in all forms of embodiment of the linear ball bearing.

It is to be noted that the runner plates are rounded on their outer surface 16, as represented in FIG. 2, in conformity with the internal circumferential surface of a receiving bearing housing bore, so that a flat abutment of the runner plates in the region of the middle longitudinal section f on the bearing housing bore is guaranteed.

Specific forms of embodiment of the invention have been represented and described in order to illustrate the use of the principles of the invention. Of course, the invention can also be realized in other ways without departing from these principles.

The reference numerals in the claims serve only for facilitation of understanding and are not to be understood as a limitation.

We claim:

1. Linear ball bush of part-annular form, comprising a cage with a cage axis having a plurality of ball circuits and a longitudinal gap defined by longitudinal faces (186), where each ball circuit comprises two substantially straight ball rows substantially parallel to the cage axis, namely a carrier ball row and a return ball row, and two curved ball rows connecting the two straight ball rows, where the respective carrier ball row is radially outwardly supported by a carrying straight track section and radially inwardly partially penetrates a slot of the cage, in order to be able to abut on a shaft partially enclosed by the cage, and part-annular seals (146) are provided for abutment on the shaft, close to the axially directed ends of the cage, said part-annular seals (146) being secured against rotation about the cage axis by circumferentially opposite abutment faces (184c, 189; 188, 190) integral with the cage (112) and the respective part-annular seal (146), said part-annular seals (146) being radially movable over their entire circumferential extent in relation to the cage axis.

2. Linear ball bush of part-annular form, comprising a cage with a cage axis having a plurality of ball circuits and a longitudinal gap defined by longitudinal faces (186), where each ball circuit comprises two substantially straight ball rows substantially parallel to the cage axis, namely a carrier ball row and a return ball row, and two curved ball rows connecting the two straight ball rows, where the respective carrier ball row is radially outwardly supported by a carrying straight track section and radially inwardly partially penetrates a slot of the cage, in order to be able to abut on a shaft partially enclosed by the cage, and part-annular seals (146) are provided for abutment on the shaft, close to the axially directed ends of the cage, said part-annular seals (146) being secured against rotation about the cage axis by circumferentially opposite abutment faces (184c, 189; 188, 190) integral with the cage (112) and the respective part-annular seal (146), said part-annular seals (146) being radially movably accommodated by means of a radially outer basic body (146a) in a respective part-annular groove (184) allocated to the cage (112) with a radially inner sealing lip (146b) resting on the shaft (178).

3. Linear ball bush according to claim 2, characterized in that the part-annular groove (184) is defined by mutually opposite, axially directed part-annular groove defining faces (184a, 144a) of the cage (112) and of an end ring (144) secured to the cage.

4. Linear ball bush according to claim 3, characterized in that on the axially directed part-annular groove defining surface (144a) of the cage (112) there is provided at least one axially directed dog (188) which passes through a piercing (190) of the part-annular seal (146), said dog (188) and said piercing (190) providing respective abutment faces of said part-annular seal (146) and said cage (112).

5. Linear ball bush according to claim 4, in which said dog (188) passes with radial play through the respective piercing (190).

6. Linear ball bush according to claim 4, characterised in that the axial height of the dog (188) is greater than the corresponding axial thickness of the part-annular seal (146) and in that the end ring (144) rests with its part-annular groove defining face (144a) on the dog (188).

7. Linear ball bush according to claim 6, characterized in that the end ring (144) is screwed to the cage (112) in the region of the dog (188).

8. Linear ball bush of part-annular form comprising a cage with a cage axis having a plurality of ball circuits and a longitudinal gap defined by longitudinal faces, where each ball circuit comprises two substantially straight ball rows substantially parallel to the cage axis, namely a carrier ball row and a return ball row, and two curved ball rows connecting the two straight ball rows, the respective carrier ball row being supported radially outwardly by a carrying straight track section and radially inwardly partially penetrating a slot of the cage, in order to be able to abut on a shaft partially enclosed by the cage, and longitudinal seal strips having a longitudinal axis are provided on the cage close to its longitudinal faces which define the longitudinal gap, for abutment on the shaft, said longitudinal seal strips (194) comprising projections (200) transverse to the longitudinal axis at their ends, wherein said projections abut under a longitudinal tension of the respective longitudinal seal strip (194) each against an axially directed support shoulder face (198) of the cage (112).

9. Linear ball bush according to claim 8, wherein part-annular seals (146) are provided close to axially directed ends of the cage (112) for abutment on the shaft.

10. Linear ball bush according to claim 9, characterized in that the support shoulder (198) is formed by a respective aperture in the cage (112) adjoining an axially directed defining face (184a) of a part-annular groove (184) of the cage (112), wherein said groove accommodates a part-annular seal (145).

11. Linear ball bush according to claim 10, characterized in that the longitudinal seal strips (194) possess continuations (202) extending beyond the respective projection (200) into the part-annular groove (184), and the part-annular seals (146) rest with peripherally directed end faces (146c) each on a continuation (202).

12. Linear ball bush according to claim 8, characterized in that a longitudinal seal strip (194) is made with a root part (194a) and a tongue part (194b), said root part (194a) being received by a longitudinal groove (196) of said cage (112) and said tongue part (194b) being intended to abut on the shaft.

13. Linear ball bush according to claim 12, characterized in that the root part (194a) is received by the longitudinal groove (196) without adhesion.

14. Longitudinal seal strip for a linear ball bush, said linear ball bush being of part-annular form and comprising a cage with a cage axis having a plurality of ball circuits and a longitudinal gap defined by longitudinal faces, where each ball circuit comprises two substantially straight ball rows substantially parallel to the cage axis, namely a carrier ball row and a return ball row, and two curved ball rows connecting the two straight ball rows, where the respective carrier ball row is supported radially outwards by a carrying straight track section and radially inwardly partially penetrates a slot of the cage, in order to be able to abut on a shaft partially enclosed by the cage, and longitudinal seal strips having a longitudinal axis are provided on the cage close to its longitudinal faces which define the longitudinal gap, for abutment on the shaft, said longitudinal seal strips (194) comprising projections (200) transverse to the longitudinal axis and adjacent to their ends, said projections abutting under a longitudinal tension of the respective longitudinal seal strip (194) against an axially directed support shoulder face (198) of the cage (112), said seal strip comprising at one or more of its ends, axially outside the respective projections (200), a grip element (204) which can be cut off after the installation of the respective longitudinal seal strip (194) in the linear ball bush (202).

15. Linear ball bush of part-annular form comprising a cage with a cage axis having a plurality of ball circuits and a longitudinal gap defined by longitudinal faces, where each ball circuit comprises two substantially straight ball rows substantially parallel to the cage axis, namely a carrier ball row and a return ball row, and two curved ball rows connecting the two straight ball rows, where the respective carrier ball row is supported radially outwards by a carrying straight track section and radially inwardly partially penetrates a slot of the cage, in order to be able to abut on a shaft partially enclosed by the cage, where longitudinal seal strips having a longitudinal axis are provided on the cage close to its longitudinal faces which define the longitudinal gap, for abutment on the shaft, said longitudinal seal strips (194) comprising projections (200) transverse to the longitudinal axis and adjacent their ends, said projections abutting under a longitudinal tension of the respective longitudinal seal strip (194) each against an axially directed support shoulder face (198) of the cage (112), said longitudinal strips having a cut or rupture face transverse to their longitudinal axis at one or more ends thereof, resulting from separating a respective end portion (204).

16. Linear ball bush of part-annular form, comprising a cage with a cage axis having a plurality of ball circuits and a longitudinal gap defined by longitudinal faces (186) where each ball circuit comprises two substantially straight ball rows substantially parallel to the cage axis, namely a carrier ball row and a return ball row, and two curved ball rows connecting the two straight ball rows, where the respective carrier ball row is radially outwardly supported by a carrying straight track section and radially inwardly partially penetrates a slot of the cage, in order to be able to abut on a shaft partially enclosed by the cage, and part-annular seals (146) are provided for abutment on the shaft, close to the axially directed ends of the cage, said part-annular seals (146) being secured against rotation about the cage axis by circumferentially opposite abutment faces (184c, 189, 188, 190) integral with the cage (112) and the respective part-annular seal (146), said abutment faces (184c, 189; 188, 190) are located adjacent to the longitudinal faces (186), and said part-annular seals (146) are radially movable in relation to the cage axis at least along an arc section thereof extending circumferentially between and approximately up to the abutment faces (190) of the respective part-annular seal.

17. Linear ball bush of part-annular form, comprising a cage axis having a plurality of ball circuits and a longitudinal gap defined by longitudinal faces (186), where each ball circuit comprises two substantially straight ball rows substantially parallel to the cage axis, namely a carrier ball row and a return ball row, and two curved ball rows connecting the two straight ball rows, the respective carrier ball row being radially outwardly supported by a carrying straight track section and radially inwardly partially penetrating a slot of the cage, in order to be able to abut on a shaft partially enclosed by the cage, said linear ball bush having part-annular seals (146) being provided for abutment on the shaft, close to the axially directed ends of the cage, said part-annular seals (146) being secured against rotation about the cage axis by circumferentially opposite abutment faces (184c, 189; 188, 190) integral with the cage (112) and the respective part-annular seal, said abutment faces (184c, 189; 188, 190) being located adjacent the longitudinal faces (186), and said part-annular seals (146) being radially movable in relation to the cage axis at least along an arc section thereof extending circumferentially between and approximately up to the abutment faces (190) of the respective part-annular seal (146).

18. Linear ball bush of part-annular form, comprising a cage with a cage axis having a plurality of ball circuits and a longitudinal gap defined by longitudinal faces, where each ball circuit comprises two substantially straight ball rows substantially parallel to the cage axis, namely a carrier ball row and a return ball row, and two curved ball rows connecting the two straight ball rows, the respective carrier ball row being radially outwardly supported by a carrying straight track section and radially inwardly partially penetrating a slot of the cage, in order to be able to abut on a shaft partially enclosed by the cage, and part-annular seals (146) being provided for abutment on the shaft, close to the axially directed ends of the cage, said part annular seals (146) being secured against rotation about the cage axis by at least one axially directed dog (188) of the cage (112), which passes through a piercing (190) of the respective part-annular seal (146).

19. Linear ball bush according to claim 18, in which said dog (188) passes with radial play through the respective piercing (190).

20. Linear ball bush according to claim 18, characterized in that the axial height of the dog (188) is greater than the corresponding axial thickness of the part-annular seal (146), and in that an end ring (144) rests on the dog (188), said cage (112) and said end ring (144) defining between them a part-annular groove (184) accommodating said part annular seal (146).

21. Linear ball bush according to claim 18, said cage being provided with two digs (188), each of said two dogs being provided adjacent a respective end face (186).

22. Linear ball bush according to claim 18, said part-annular seals (146) being radially movable in relation to the cage axis at least along an arc section thereof extending circumferentially between and approximately to the dogs (188).

* * * * *

UNITED STATES PATENT AND TRADEMARK OFFICE
CERTIFICATE OF CORRECTION

PATENT NO. : 5,044,779

DATED : September 3, 1991

INVENTOR(S) : Ernst Albert, German Dutsch and Rainer Hofling

It is certified that error appears in the above-identified patent and that said Letters Patent is hereby corrected as shown below:

Title page, Item 56, 7th line, "4,483,985" should read --4,438,985--.
Col. 2, line 10, "cased" should read --cage--.
Col. 3, line 63, "balls; De" should read --balls;--.
Col. 5, line 36, "s track" should read --straight track--.
Col. 5, line 44, "FIGS. 7" should read --FIG. 7--.
Col. 8, line 26, "securing" should read --securing of--.
Col. 8, line 31, "a 146" should read --146--.
Col. 12, line 41, "a cage axis" should read --a cage with a cage axis--.
Col. 14, line 9, "digs" should read --dogs--.

Signed and Sealed this

Twenty-third Day of February, 1993

Attest:

STEPHEN G. KUNIN

*Attesting Officer*   Acting Commissioner of Patents and Trademarks